(12) United States Patent
Kuras et al.

(10) Patent No.: US 11,066,074 B2
(45) Date of Patent: Jul. 20, 2021

(54) CONTROL OF AN ENGINE OF A MACHINE BASED ON DETECTED LOAD REQUIREMENTS OF THE MACHINE

(71) Applicant: Caterpillar Inc., Deerfield, IL (US)

(72) Inventors: Brian Kuras, East Peoria, IL (US); Ankit Sharma, Peoria, IL (US); Lance Cowper, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 37 days.

(21) Appl. No.: 16/534,487

(22) Filed: Aug. 7, 2019

(65) Prior Publication Data
US 2021/0039643 A1 Feb. 11, 2021

(51) Int. Cl.
*B60W 30/188* (2012.01)
*F02D 29/04* (2006.01)
(Continued)

(52) U.S. Cl.
CPC .......... *B60W 30/188* (2013.01); *B60W 10/06* (2013.01); *B60W 10/30* (2013.01); *F02D 29/04* (2013.01); *F02D 29/06* (2013.01); *B60W 30/1882* (2013.01); *B60W 30/1886* (2013.01); *B60W 2300/17* (2013.01);
(Continued)

(58) Field of Classification Search
CPC ............ Y10T 477/675; B60W 30/188; B60W 30/1886; B60W 30/1882; B60W 10/06; B60W 10/30; B60W 2300/17; B60W 2510/0666; B60W 2510/20; B60W 2510/0638; B60W 2510/0676; B60W 2710/0644; B60W 2710/0677; F02D 29/04; F02D 29/06; F02D 2200/101; F02D 2200/1002; F02D 2200/60

See application file for complete search history.

(56) References Cited

U.S. PATENT DOCUMENTS

| | | | |
|---|---|---|---|
| 9,399,465 B2 | 7/2016 | Slaton et al. | |
| 9,574,327 B2 | 2/2017 | Ishihara et al. | |

(Continued)

FOREIGN PATENT DOCUMENTS

| | | |
|---|---|---|
| CN | 107117170 B | 4/2019 |
| WO | 2019070664 A1 | 4/2019 |

OTHER PUBLICATIONS

Gamazo-Real et al. "Postion and Speed Control of Brushless DC Motors Using Sensor Less Techniques and Applications Trends" In: sensors. Jul. 19, 2010 (Jul. 19, 2010) Retrieved on Sep. 7, 2020 (Sep. 7, 2020) from <https://www.nebi.nih.gov/pmc/articles/PMC3231115/pdf/sensors-10-06901.pdf> entire document.

*Primary Examiner* — Roger L Pang
(74) *Attorney, Agent, or Firm* — Harrity & Harrity LLP

(57) ABSTRACT

An electronic control unit to control an engine control module of an engine is disclosed. The electronic control unit may receive, from a load monitoring device, power command information associated with a load of an engine. The electronic control unit may determine, based on the power command information, a total power command of the engine. The electronic control unit may determine, based on the total power command, a target engine speed for the engine. The electronic control unit may cause an engine control module to control the engine to operate in association with the target engine speed.

20 Claims, 4 Drawing Sheets

(51) Int. Cl.
   *F02D 29/06*  (2006.01)
   *B60W 10/06*  (2006.01)
   *B60W 10/30*  (2006.01)

(52) U.S. Cl.
   CPC ........... *B60W 2510/0638* (2013.01); *B60W 2510/0666* (2013.01); *B60W 2510/0676* (2013.01); *B60W 2510/20* (2013.01); *B60W 2710/0644* (2013.01); *B60W 2710/0677* (2013.01); *F02D 2200/101* (2013.01); *F02D 2200/1002* (2013.01); *F02D 2200/60* (2013.01)

(56) References Cited

U.S. PATENT DOCUMENTS

| | | | |
|---|---|---|---|
| 2006/0092849 A1 | 5/2006 | Santoso et al. | |
| 2008/0254935 A1* | 10/2008 | Kasuga | B60W 10/06 477/3 |
| 2009/0222162 A1 | 9/2009 | Carlton et al. | |
| 2010/0063658 A1* | 3/2010 | Martin | B60W 10/06 701/22 |
| 2010/0156117 A1 | 6/2010 | Allen | |
| 2010/0235066 A1 | 9/2010 | Hill | |
| 2013/0057305 A1 | 3/2013 | Jimbo | |
| 2014/0054902 A1* | 2/2014 | Kawaguchi | F02D 41/021 290/40 B |
| 2015/0211466 A1 | 7/2015 | Puri et al. | |
| 2015/0307077 A1 | 10/2015 | Xing et al. | |
| 2016/0145836 A1* | 5/2016 | Yamada | E02F 9/2289 701/50 |
| 2016/0230369 A1* | 8/2016 | Kaneko | B60K 6/46 |
| 2016/0290369 A1* | 10/2016 | Opdenbosch | F02D 29/04 |
| 2016/0326720 A1 | 11/2016 | Uno et al. | |
| 2017/0016405 A1* | 1/2017 | Moore | F02D 35/0092 |
| 2018/0029586 A1 | 2/2018 | Dextreit et al. | |
| 2018/0230927 A1 | 8/2018 | Hayden et al. | |
| 2020/0331526 A1* | 10/2020 | Flaxman | B60W 10/08 |

\* cited by examiner

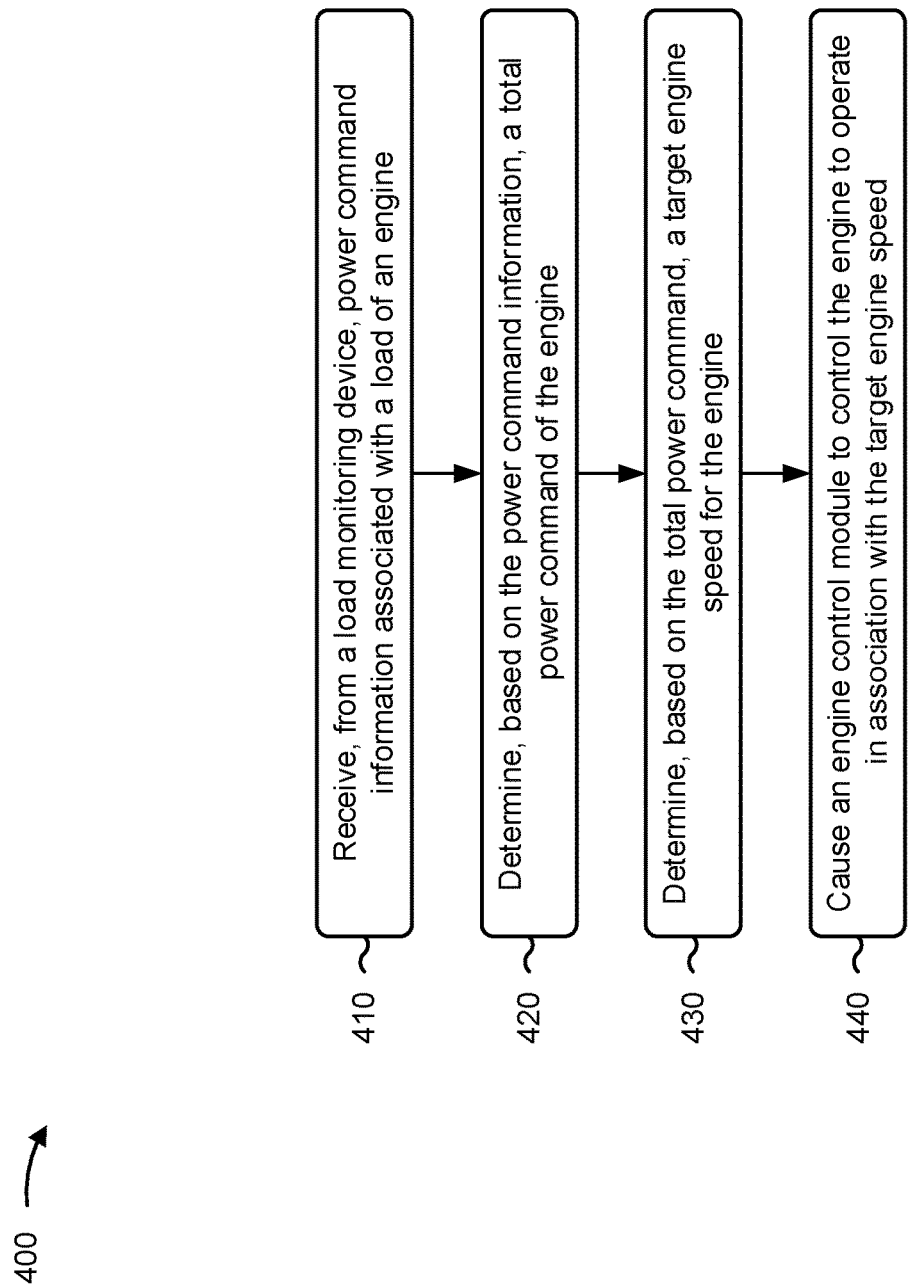

CONTROL OF AN ENGINE OF A MACHINE BASED ON DETECTED LOAD REQUIREMENTS OF THE MACHINE

TECHNICAL FIELD

The present disclosure relates generally to engine control and, for example, to controlling speed/power of an engine.

BACKGROUND

An engine control module (ECM) controls a power output of an engine by sending a fuel output to one or more fuel injectors of the engine. The ECM determines the fuel output based on an instantaneous engine speed of an engine and a desired engine speed of an engine. The ECM sets the fuel output in an effort to synchronize the instantaneous engine speed with the desired engine speed. The desired engine speed may be determined using one or more operator inputs (e.g., an accelerator input, a decelerator input, a transmission setting, a speed setting (e.g., a machine speed setting and/or engine speed setting, and/or the like), and/or the like). Accordingly, the ECM determines fuel outputs corresponding to differences between desired engine speeds and instantaneous engine speeds of the engine.

However, a load of an engine may change at any time based on the operating conditions of the machine. The change to the load of the engine may decrease the instantaneous engine speed (e.g., due to absorbing and/or requiring more power from an output of the engine) without altering the desired engine speed. In such a case, the engine may experience lugging corresponding to an unexpected difference in desired engine speed and instantaneous engine speed. The ECM may account for the unexpected difference by increasing the fuel output. Alternatively, the desired engine speed may be reduced (e.g., based on an operator input), and the engine may provide unnecessary power until the ECM recognizes the change in the desired engine speed and adjusts a fuel output to the fuel injectors.

One approach to engine control is disclosed in U.S. Patent Publication No. 2018/0230927 that published on Aug. 16, 2018 ("the '927 reference"). In particular, the '927 reference describes a control method for selecting an optimal multiple step operating mode for a multiple cylinder motor vehicle engine system having variable lift that includes prioritizing each of a full torque capacity mode having all cylinders operating at high lift, a first reduced capacity economy mode having all cylinders operating at low lift, and a second reduced capacity economy mode having fewer than all of the cylinders operating at low lift with at least one cylinder deactivated based on predicted fuel economy of each of the modes.

While the control method of the '927 reference may cause an engine to operate in a fuel economy mode, the control method of the '927 reference operates the engine in a cylinder deactivation mode and/or in a low-lift mode.

The target engine speed module of the present disclosure solves one or more of the problems set forth above and/or other problems in the art.

SUMMARY

According to some implementations, a method may include receiving, from a load monitoring device, power command information associated with a load of an engine controlled by an engine control module; determining, based on the power command information, a total power command of the engine; determining an instantaneous engine speed of the engine; determining, based on the total power command satisfying a threshold associated with the instantaneous engine speed, a target engine speed for the engine; and causing the engine control module to control the engine to operate in association with the target engine speed.

According to some implementations, a device may include one or more memories; and one or more processors, communicatively coupled to the one or more memories, configured to: receive power command information associated with a set of loads of an engine; determine, based on the power command information, a total power command for the set of loads; determine, based on the total power command and an instantaneous engine speed of the engine, a target engine speed for the engine; and cause an engine control module to control the engine to operate in association with the target engine speed.

A system may include an engine, an engine control module, a load monitoring device, and an electronic control unit to: receive, from the load monitoring device, power command information associated with a load of the engine; determine, based on the power command information, a total power command of the engine; determine, based on the total power command, a target engine speed for the engine; and cause the engine control module to control the engine to operate in association with the target engine speed.

BRIEF DESCRIPTION OF THE DRAWINGS

FIG. 4 is a flowchart of an example process associated with controlling an engine of a machine based on detected load requirements of the machine.

DETAILED DESCRIPTION

Figure 1:
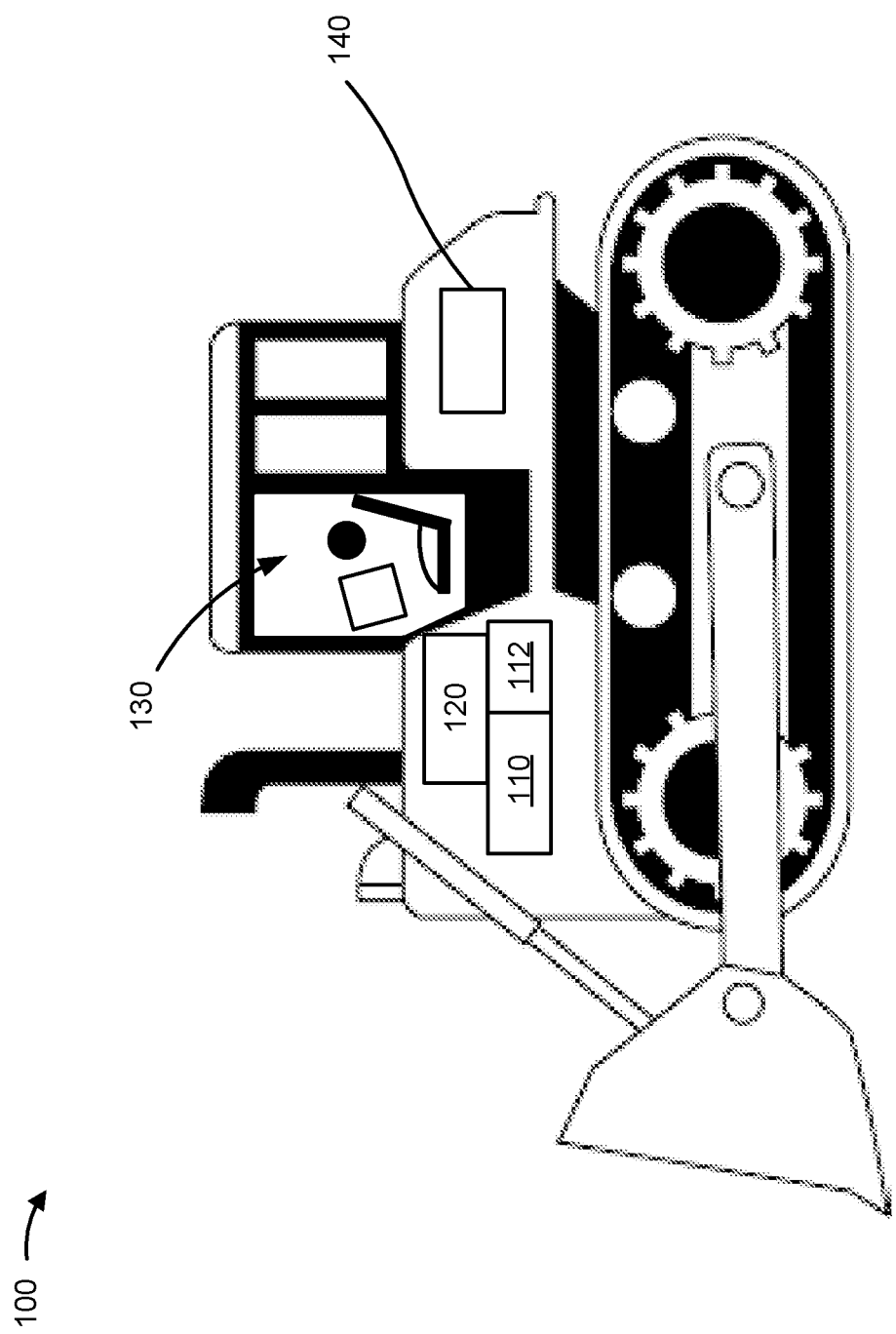
FIG. 1 is diagram of an example machine described herein.

FIG. 1 is a diagram of an example machine 100 described herein. Machine 100 includes an engine 110, an engine control module (ECM) 112, a sensor system 120, an operator interface 130, and an electronic control unit (ECU) 140.

Engine 110 may include an internal combustion engine, such as a compression ignition engine, a spark ignition engine, a laser ignition engine, a plasma ignition engine, and/or the like. As described herein, engine 110 provides power to machine 100 and/or a set of loads (e.g., one or more components that absorbs power and/or uses power to operate) associated with machine 100. For example, engine 110 may provide power to a drive system (e.g., a powertrain that includes a transmission, a driveshaft, a differentiator, a torque converter, a gear drive, one or more ground engaging implements, and/or the like) to enable maneuverability of machine 100.

Engine 110 may provide power to an implement of machine 100, such as an implement used in mining, construction, farming, transportation, or any other industry. In the example of FIG. 1 that shows machine 100 as a bulldozer and/or track-type-tractor (TTT), engine 110 may power one or more components (e.g., one or more hydraulic pumps, one or more actuators, one or more electric motors, and/or the like) of the blade of the bulldozer. In some implementations, an implement of machine 100 may receive power from engine 110 via a power take-off (PTO) system of machine 100.

Engine 110 may provide power to one or more accessories of machine 100 and/or parasitic loads of engine 110. For example, engine 110 may be configured to provide power to a cooling system (e.g., to a fan of a fan-cooled system, to a pump of a liquid cooled system, an air-conditioner unit, and/or the like), an alternator of an electronics system of machine 100 (e.g., to power components of operator interface 130, charge a battery of machine 100), one or more hydraulic pumps of machine 100, and/or the like.

ECM 112 may include one or more devices to control engine 110. ECM 112 is implemented as a processor, such as a central processing unit (CPU), an accelerated processing unit (APU), a microprocessor, a microcontroller, a digital signal processor (DSP), a field-programmable gate array (FPGA), an application-specific integrated circuit (ASIC), or another type of processing component. The processor is implemented in hardware, firmware, and/or a combination of hardware and software. In some implementations, ECM 112 includes one or more processors capable of being programmed to perform a function. In some implementations, one or more memories, including a random-access memory (RAM), a read only memory (ROM), and/or another type of dynamic or static storage device (e.g., a flash memory, a magnetic memory, and/or an optical memory) may store information and/or instructions for use by ECM 112.

ECM 112 may include a memory (e.g., a non-transitory computer-readable medium) capable of storing instructions, that when executed, cause the processor to perform one or more processes and/or methods described herein. ECM 112 may execute the instructions to perform various control functions and processes to control engine 110 and to control settings of engine 110. ECM 112 may include any appropriate type of engine control system configured to perform engine control functions such that engine 110 may operate properly.

As described herein, ECM 112 may be configured to control fuel output of engine 110 by providing instructions to one or more fuel injectors of engine 110. ECM 112 may be configured to determine the fuel output based on an engine speed of engine 110 (e.g., an instantaneous engine speed of engine 110 during operation of engine 110) and a target engine speed. The engine speed (e.g., an engine output speed) may be determined based on information received from a sensor (e.g., a speed sensor that is monitoring the instantaneous engine speed of engine 110) of sensor system 120. The target engine speed may be determined and provided by ECU 140 in accordance with example implementations described herein. The target engine speed may be based on and/or correspond to a desired engine speed that is determined by ECU 140 based on an operator input received via operator interface 130.

Sensor system 120 may provide measurements associated with various parameters used by ECM 112 and/or ECU 140 to control engine 110. Sensor system 120 may include physical sensors and/or any appropriate type of control system that generates measurements of parameters based on a computational model and/or one or more sensed properties of engine 110 and/or machine 100. Example sensors may include temperature sensors (e.g., to detect temperature of air, exhaust, a component, coolant, and/or the like), position sensors (e.g., to detect a position of a valve, an actuator, an engine part (e.g., a driveshaft, a piston assembly) of engine 110, and/or the like), speed sensors (e.g., to detect an engine speed, a machine speed, and/or the like), pressure sensors (e.g., to detect a measure of compression of a cylinder of engine 110), emissions sensors (e.g., to detect emission levels of engine 110), and/or the like.

Operator interface 130 may include one or more devices associated with receiving, generating, storing, processing, and/or providing information associated with controlling the target speed/power of engine 110. For example, operator interface 130 may include a control console of machine 100 that includes one or more input components to permit an operator to set a speed of engine 110 and/or a speed of machine 100 (which may correlate to a speed of engine 110). Such input components may include an electronic user interface (e.g., a touchscreen, a keyboard, a keypad, and/or the like) and/or a mechanical user interface (e.g., an accelerator pedal, a decelerator pedal, a brake pedal, a gear shifter for a transmission, and/or the like). As described herein, ECU 140 may determine a desired engine speed (e.g., an engine speed that corresponds to a user setting and/or a user input and does not consider other factors of engine 110, such as load requirements and/or power command information from a load of engine 110). In some implementations, operator interface 130 may include one or more input and/or output components that are separate from and/or remotely located from machine 100 (e.g., if machine 100 is an autonomous vehicle).

In operation, computer software instructions may be stored in or loaded to ECU 140. ECU 140 may execute the computer software instructions to perform various control functions and processes to control one or more systems of machine 100, such as engine 110 via ECM 112, sensor system 120, operator interface 130, and/or the like. ECU 140 may execute computer software instructions to cause ECM 112 to adjust a fuel output based on providing a target engine speed for engine 110, as described herein.

ECU 140 may be configured to determine one or more operating parameters and/or characteristics of machine 100 based on information received from sensor system 120, operator interface 130, and/or one or more load monitoring devices associated with loads of engine 110. ECU 140 may determine a target engine speed based on the information, as described herein, and provide the target engine speed to ECM 112 to cause ECM 112 to control engine 110 according to the target engine speed.

As indicated above, FIG. 1 is provided as an example. Other examples may differ from what was described in connection with FIG. 1.

Figure 2:
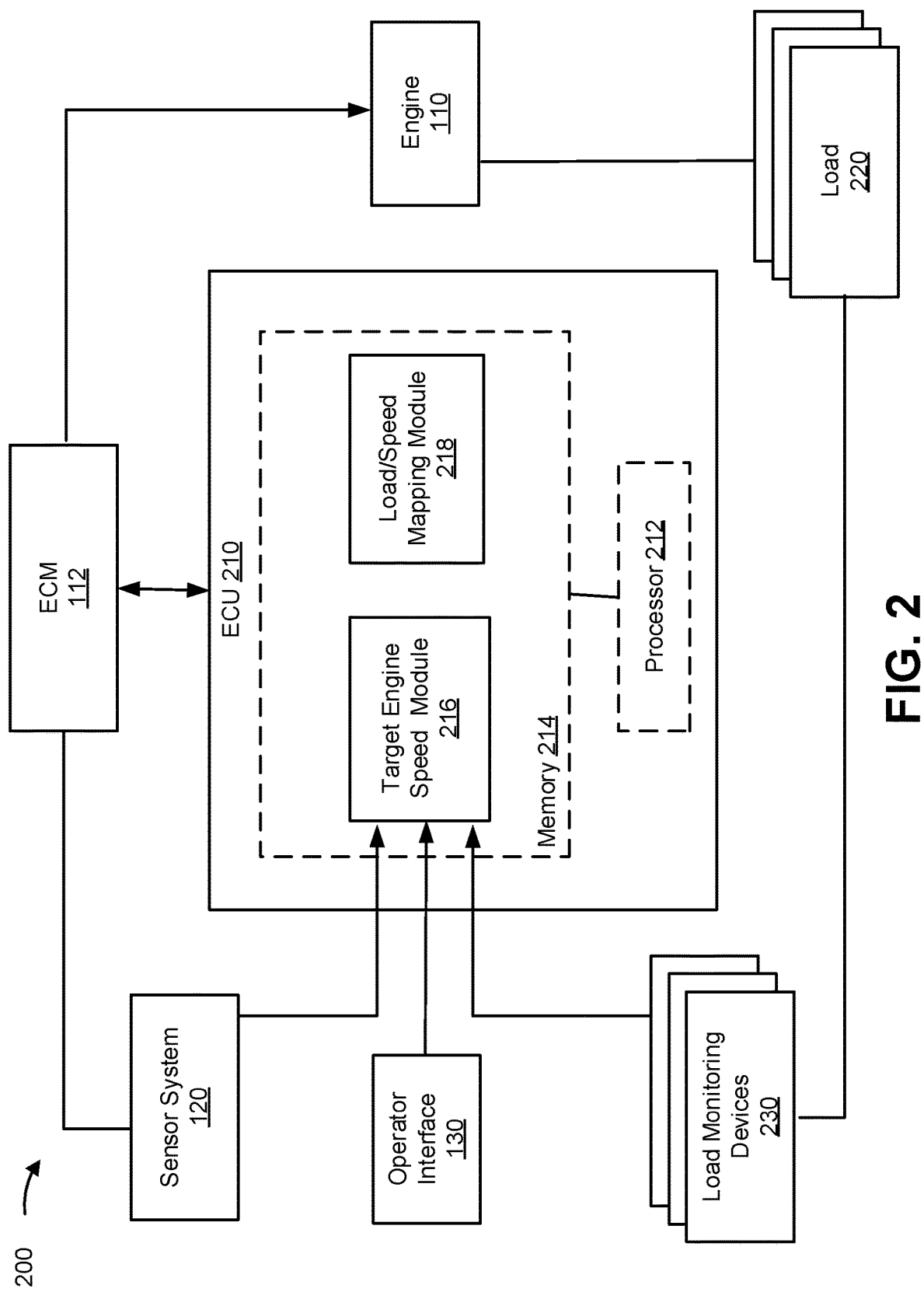
FIG. 2 is a diagram of an example system in which example devices and/or methods described herein may be implemented.

FIG. 2 is a diagram of an example system 200 in which devices and/or methods, described herein, may be implemented. As shown in FIG. 2, system 200 may include an ECU 210 that includes a processor 212, a memory 214, a target engine speed module 216, and a load/speed mapping module 218. Furthermore, system 200 may include one or more loads 220 (referred to herein individually as "load 220," and collectively as "loads 220") and/or one or more load monitoring devices 230 (referred to herein individually as "load monitoring device 230" and collectively as "load monitoring devices 230"). System 200 may include engine 110, ECM 112, sensor system 120, and operator interface 130 of FIG. 1. Devices of system 200 may interconnect via wired connections, wireless connections, or a combination of wired and wireless connections.

ECU 210 may correspond to ECU 140 of FIG. 1. Processor 212 is implemented in hardware, firmware, and/or a combination of hardware and software. Processor 212 may include a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. Processor 212 may include one or more processors capable of being programmed to perform a function. Memory 214 includes a random-access memory (RAM), a read only memory (ROM), and/or another type of dynamic or static storage device (e.g., a flash memory, a magnetic memory, and/or an optical memory) that stores information and/or instructions for use by processor 212 (e.g., information and/or instructions associated with target engine speed module 216, and a load/speed mapping module 218, and/or the like).

Target engine speed module 216 is configured to determine a target engine speed for engine 110 and/or configure ECM 112 to control an engine speed of engine 110. Target engine speed module 216 may receive measurements associated with operating parameters and/or an operator input associated with engine 110. For example, target engine speed module 216 may receive, from sensor system 120, one or more measurements associated with an instantaneous engine speed of engine 110, one or more measurements associated with a temperature of one or more components of engine 110, and/or the like. Additionally, or alternatively, target engine speed module 216 may receive an operator input that corresponds to a desired engine speed (e.g., an engine speed corresponding to power settings and/or speed settings for engine 110 and/or machine 100), an operator input associated with steering (e.g., performing a steering maneuver of) machine 100, and/or the like. ECU 210 may determine a total power command based on the determined instantaneous engine speed of engine 110, temperatures of engine 110, and/or operator inputs to permit ECU 210 to determine a target engine speed that can be provided to ECM 112 to control engine 110, as described herein.

As described herein, target engine speed module 216 may store information and/or logic in load/speed mapping module 218. For example, such information may be included in a mapping of thresholds (e.g., thresholds associated with instantaneous engine speeds, such as a maximum power output threshold or minimum power output threshold of engine 110 at particular engine speeds), measurements (e.g., reference measurements associated with engine speeds, temperatures, and/or the like), operator inputs (e.g., operator inputs corresponding to a desired engine speed of engine 110, operator inputs corresponding to steering inputs indicating steering for machine 100, and/or the like) with corresponding target engine speeds for engine 110. In this way, target engine speed module 216 may reference load/speed mapping module 218 to determine a target engine speed for engine 110.

Load 220 may include one or more components, devices, and/or the like that are configured to absorb and/or operate using power from engine 110. For example, load 220 may include a powertrain of engine 110, an implement of machine 100, one or more components of accessories of machine 100, and/or the like. Accordingly, load 220 may include a transmission coupled to the engine, an electrical implement of the engine, a hydraulic implement of the engine, and/or the like.

Load monitoring device 230 includes one or more devices configured to monitor load 220 of engine 110. For example, load monitoring device 230 may include one or more sensors and/or controllers that monitor and/or control load 220. Load monitoring devices 230 may provide power command information to ECU 210 as described herein. The power command information may be generated by load monitoring device 230 according to one or more parameters of load 220 (e.g., the type of load 220, the type of power required by load 220, the operating state of load 220, and/or the like). For example, load monitoring device 230 may include one or more of a transmission controller of a transmission coupled to engine 110, an electrical implement controller associated with an electrical implement powered by engine 110, and/or a hydraulic implement controller associated with a hydraulic implement powered by engine 110. Accordingly, the power command information may include a torque command of a transmission (which can be converted to a power command using a corresponding transmission speed), an electrical current command and/or a voltage command of an electrical implement, a pressure command associated with a hydraulic implement (which can be converted to a power command using an associated pump displacement of the hydraulic implement and/or a corresponding pump speed), and/or the like.

In some implementations, a target engine speed may correspond to a particular engine speed of a set of engine speeds. For example, the target engine speed may be one of a high engine speed (e.g., approximately 1700 revolutions per minute (RPM) or faster), a medium engine speed (e.g., a speed between high engine speed and low engine speed, such as approximately 1500 RPM), or a low engine speed (e.g., approximately 1400 RPM or slower). The engine 110 may have a threshold range of power output corresponding to each of the target engine speeds. For example, engine 110 may be able to output the most power when engine 110 is operated at a high engine speed, the least power when operated at a low engine speed, and intermediate power when operated at a medium speed. Such information may be managed and/or maintained via load/speed mapping module 218, as described herein. Additionally, or alternatively, a target engine speed may correspond to any engine speed between a maximum engine speed and a minimum engine speed.

As described herein, ECU 210 may determine a total power command based on the power information received from load monitoring devices 230. For example, the total power command may correspond to a sum of the power required for the loads powered by machine 100. Based on the total power command and an instantaneous engine speed of engine 110, ECU 210 may determine whether the engine speed (and target engine speed) of engine 110 needs to be adjusted. For example, if the total power command does not fall within a threshold range of power output from engine 110 at the particular instantaneous engine speed, then ECU 210 may determine that the instantaneous engine speed is to be increased to a target engine speed that can handle an increased load or decreased to a target speed that can conserve power.

In some implementations, the ECU 210 may be configured to use one or more overrides when determining a target engine speed. For example, the ECU 210 may determine that an instantaneous engine speed is not to be adjusted lower (independent of the power command information received from load monitoring device 230) but may be adjusted higher (if the power command demands a higher target engine speed) when an operator input indicates that the operator (and/or machine) is performing a steering maneuver (e.g., is traveling in any direction other than being within a threshold angular range of moving straight forward or backward). As another example, ECU 210 may determine that a target engine speed for engine 110 is to be a high or maximum engine speed (independent of the power command information received from load monitoring device 230) when ECU 210 receives a temperature measurement from sensor system 120 indicating that a temperature of a component of any machine component (transmission, implements, engine, etc.) satisfies a threshold (e.g., is greater than a high operational temperature threshold for the component). In this way, in addition to monitoring a total power command for engine 110, ECU 210 may monitor one or more other systems of machine 100 to determine a target engine speed for engine 110 to optimize the cooling performance of the entire machine.

The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of system 200 may perform one or more functions described as being performed by another set of devices of system 200.

Figure 3:
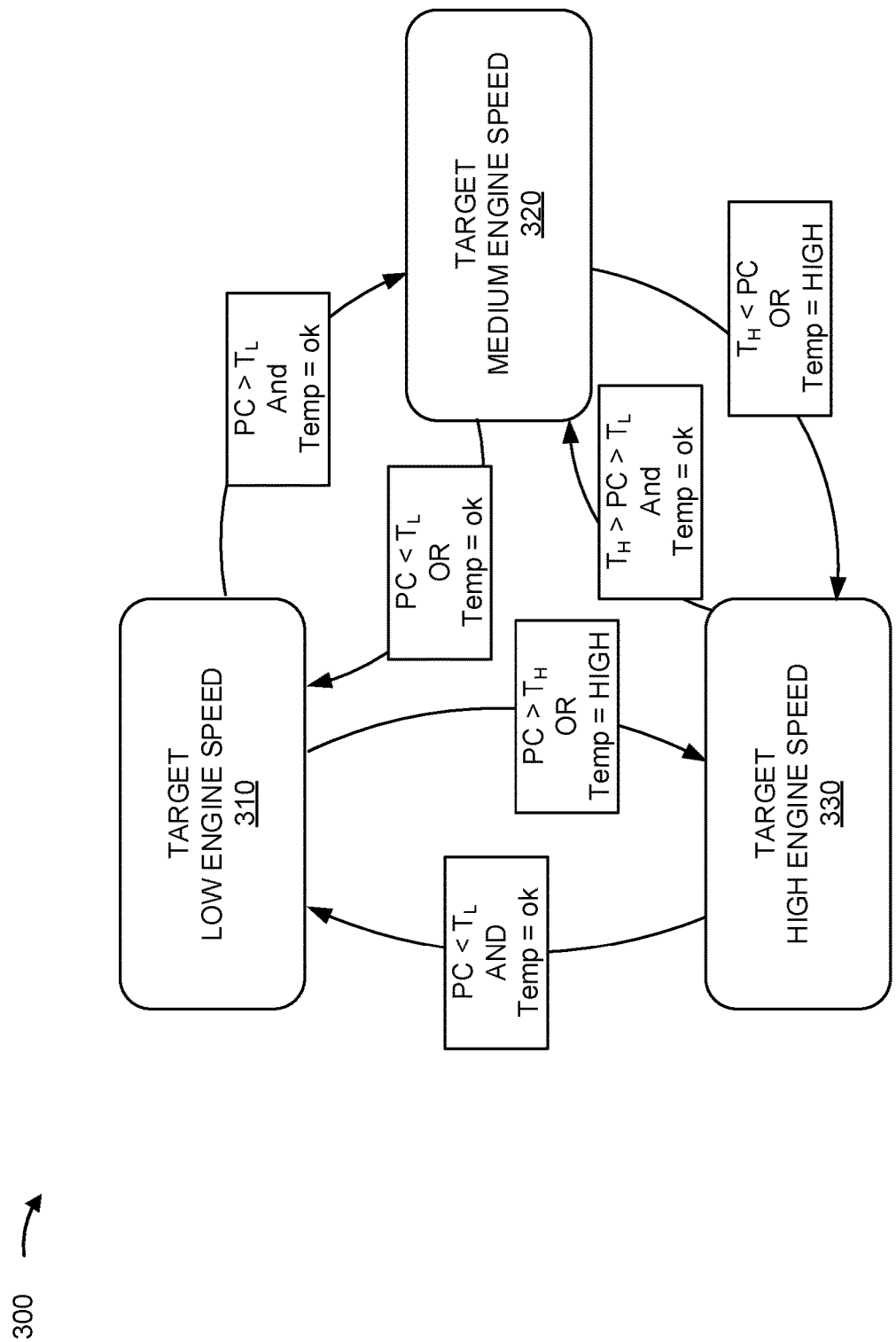
FIG. 3 is a diagram of an example state machine for use in an example implementation described herein.

FIG. 3 is a diagram of an example state machine 300 for use in an example implementation described herein. State machine 300 may represent control states associated with engine 110. ECU 210 may use state machine 300 to control ECM 112 according to an instantaneous engine speed of engine 110, a total power command determined from power command information from load monitoring devices 230, a temperature associated with engine 110, one or more operating inputs from operator interface 130, and/or the like.

As shown in FIG. 3, state machine 300 includes a target low engine speed state 310, a target medium engine speed state 320, and a target high engine speed state 330. In state machine 300, when control is in target low engine speed state 310, ECU 210 may determine that a target engine speed of engine 110 is to be increased to a medium engine speed when a determined total power command ("PC") is greater than a low power output threshold ("$T_L$") of engine 110 (thereby advancing control to target medium engine speed state 320) and a temperature (e.g., an operating temperature of engine 110, a temperature of one or more components associated with engine 110, a temperature of one or components cooled by an implement that receives power from engine 110, and/or the like) is below a high temperature threshold (shown as "ok"). Additionally, or alternatively, when control is in target low engine speed state 310, ECU 210 may determine that a target engine speed of engine 110 is to be increased to a high engine speed when a determined total power command is greater than a high power output threshold ("$T_H$") of engine 110 (thereby advancing control to target high engine speed state 330) or the temperature satisfies a high temperature threshold (shown as "HIGH").

In state machine 300, when control is in target medium engine speed state 320, ECU 210 may determine that a target engine speed of engine 110 is to be increased to a high engine speed when a determined total power command is greater than the high power output threshold ("$T_H$") of engine 110 (thereby advancing control to target high engine speed state 330) or the temperature satisfies the high temperature threshold. Additionally, or alternatively, when control is in target medium engine speed state 320, ECU 210 may determine that a target engine speed of engine 110 is to be decreased to a low engine speed when a determined total power command is less than the low power output threshold ("$T_L$") of engine 110 (thereby advancing control to target low engine speed state 310) and the temperature is below the high temperature threshold.

In state machine 300, when control is in high engine speed state 330, ECU 210 may determine that a target engine speed of engine 110 is to be decreased to a medium engine speed when a determined total power command is less than the high power output threshold ("$T_H$") and greater than the low power output threshold ("$T_L$") of engine 110 (thereby advancing control to medium engine speed state 320) and the temperature is below the high temperature threshold. Additionally, or alternatively, when control is in target high engine speed state 330, ECU 210 may determine that a target engine speed of engine 110 is to be decreased to a low engine speed when a determined total power command is less than the low power output threshold ("$T_L$") of engine 110 (thereby advancing control to target low engine speed state 310) and the temperature is below the high temperature threshold.

As indicated above, FIG. 3 is provided as an example. Other examples may differ from what was described in connection with FIG. 3.

FIG. 4 is a flow chart of an example process 400 for controlling an engine of a machine based on detected load requirements of the machine. In some implementations, one or more process blocks of FIG. 4 may be performed by an ECU (e.g., ECU 210). In some implementations, one or more process blocks of FIG. 4 may be performed by another device or a group of devices separate from or including the ECU, such as an ECM (e.g., ECM 112), a load monitoring device (e.g., load monitoring device 230), and/or the like.

As shown in FIG. 4, process 400 may include receiving, from a load monitoring device, power command information associated with a load of an engine (block 410). For example, the ECU (e.g., using processor 212, memory 214, target engine speed module 216, load/speed mapping module 218, and/or the like) may receive, from a load monitoring device, power command information associated with a load of an engine, as described above.

The power command information may correspond to a request for an increase or decrease in power associated with the load. Additionally, or alternatively, the power command information may correspond to a change in a power requirement of the load that is not caused by an operator input.

The load monitoring device may include at least one of: a transmission controller of a transmission coupled to the engine and the power command information may include a torque command of the transmission and associated speed of the transmission; an electrical implement controller associated with an electrical implement of the engine, and the power command information includes a current command and a voltage command of the electrical implement; or a hydraulic implement controller associated with a hydraulic implement of the engine, and the power command information includes a pressure command, associated pump displacement and pump speed associated with the hydraulic implement.

As further shown in FIG. 4, process 400 may include determining, based on the power command information, a total power command of the engine (block 420). For example, the ECU (e.g., using processor 212, memory 214, target engine speed module 216, load/speed mapping module 218, and/or the like) may determine, based on the power command information, a total power command of the engine, as described above.

The total power command may correspond to a sum of individual power requests, in the power command information, of a set of loads associated with the load monitoring device.

As further shown in FIG. 4, process 400 may include determining, based on the total power command, a target engine speed for the engine (block 430). For example, the ECU (e.g., using processor 212, memory 214, target engine speed module 216, load/speed mapping module 218, and/or the like) may determine, based on the total power command, a target engine speed for the engine, as described above.

The target engine speed may be determined based on an instantaneous engine speed of the engine and a desired engine speed of the engine, and the desired engine speed is determined based on an operator input associated with a power output from the engine. Additionally, or alternatively, the target engine speed may be determined to be different from an instantaneous engine speed based on the total power command satisfying a threshold power output associated with the instantaneous engine speed.

In some implementations, the target engine speed is determined based on: increasing a desired engine speed of the engine when the total power command is greater than a threshold corresponding to the instantaneous engine speed of the engine, or decreasing the desired engine speed of the engine when the total power command is less than a threshold corresponding to the instantaneous engine speed of the engine, and the desired engine speed is determined based on an operator input associated with a power output from the engine.

According to some implementations, when the ECU receives an operator input that indicates that a steering maneuver associated with a machine of the engine is being performed, the ECU is configured to either maintain or allow an increase in target engine speed while the operator input indicates that the steering maneuver is being performed.

As further shown in FIG. 4, process 400 may include causing an engine control module to control the engine to operate in association with the target engine speed (block 440). For example, the ECU (e.g., using processor 212, memory 214, target engine speed module 216, load/speed mapping module 218, and/or the like) may cause an engine control module to control the engine to operate in association with the target engine speed, as described above.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

INDUSTRIAL APPLICABILITY

An engine control module (e.g., ECM 112) may use an instantaneous engine speed and a desired engine speed (which is based on an operator input) to control an engine (e.g., engine 110). However, during operation, the ECM may receive a desired engine speed that does not correlate to an actual load on the engine. For example, a desired engine speed may indicate that the engine is to operate at a high engine speed, when a load on the engine is relatively low, thus wasting resources (e.g., consumable resources, such as fuel, lubricant, and/or the like, hardware resources caused by wear and tear, and/or the like). Alternatively, the desired engine speed may indicate that the engine is to operate at a low engine speed, when the load on the engine is relatively high, thus causing the engine to lug excessively, which requires the ECM to correct the lugging by increasing a fuel output. Such a process includes delayed time, which reduces performance and/or may also waste resources because the engine is not operating efficiently while lugging and then needs to increase fuel to compensate for the lugging. Accordingly, such techniques, an ECM is configured to reactively control an engine speed of the engine.

According to some implementations described herein, an electronic control unit (e.g., ECU 210) enables an ECM to proactively increase or decrease an engine speed according to a total power command of an engine, thus improving a response time between adjusting speeds of an engine and reducing engine lugging. The ECU may determine the total power command based on measurements received from one or more load monitoring devices of one or more loads associated with engine 110. In this way, rather than the ECM reacting to an engine speed being slowed due to an increased load that is not communicated to the ECM, the ECU may cause the ECM to increase the engine speed as soon as the ECU receives power command information indicating that the power command of the load is increasing (e.g., beyond a threshold). On the other hand, rather than an ECM reacting to the desired engine speed being lowered due to an operator input, the ECU may cause the ECM to decrease the engine speed as soon as the ECU receives power command information indicating that the power command of the load is decreasing (e.g., below a threshold). Accordingly, the ECU may cause the ECM to control the engine to operate at as low of an engine speed as feasible (according to the total power command of the engine) to conserve resources associated with operating the engine.

In some implementations, the ECU may be configured with one or more overrides to preserve hardware associated with the engine. For example, the ECU may override power command information when a temperature of any machine component (transmission, implements, engine, etc.) is above a particular threshold and increase the engine speed to increase power to a cooling system of the engine. Additionally, the ECU may improve safety, and/or an operator experience associated with operating the machine, by maintaining or only allowing an increase of engine speed during a steering maneuver.

Furthermore, the ECU may be configured, without having to correspondingly adjust and/or reconfigure an ECM or an engine controlled by the ECM. For example, the ECU may be configured to be adaptable and/or interchangeable within a machine and/or included as software within a machine (e.g., as an aftermarket update) so that hardware of a machine, an engine, and/or the like does not need to be replaced, reconfigured, and/or correspondingly updated. For example, the ECU may provide a target engine speed that corresponds to a desired engine speed used by the ECM to control an engine. In other words, the ECU may be configured to replace a previously utilized desired engine speed, that was determined according to user input, with a target engine speed that is determined based on total power command of the engine, as described herein.

What is claimed is:
1. A method, comprising:
 receiving, by a device and from a load monitoring device, power command information associated with a load of an engine controlled by an engine control module;
 determining, by the device and based on the power command information, a total power command of the engine;
 determining, by the device, an instantaneous engine speed of the engine;
 determining, by the device, based on whether a steering input indicates that a steering maneuver of a machine of the engine is being performed, and based on the total power command satisfying a threshold associated with the instantaneous engine speed, a target engine speed for the engine; and causing, by the device, the engine control module to control the engine to operate in association with the target engine speed.

2. The method of claim 1, wherein the power command information corresponds to a change in a power requirement of the load that is not caused by an operator input.

3. The method of claim 1, wherein the load monitoring device includes at least one of:
a transmission controller of a transmission coupled to the engine and the power command information includes at least one of a torque command of the transmission or an associated transmission speed of the transmission,
an electrical implement controller associated with an electrical implement of the engine and the power command information includes a change in at least one of an electrical current command or a voltage command of the electrical implement, or
a hydraulic implement controller associated with a hydraulic implement of the engine and the power command information includes at least one of a pressure command, an associated pump displacement or a corresponding pump speed associated with the hydraulic implement.

4. The method of claim 1, wherein the threshold associated with the instantaneous engine speed corresponds to a maximum power output of the engine at the instantaneous engine speed or a minimum power output of the engine at the instantaneous engine speed.

5. The method of claim 1, wherein the target engine speed is determined to be greater than the instantaneous engine speed when the total power command is increased based on the power command information and the target engine speed is determined to be less than the instantaneous engine speed when the total power command is decreased based on the power command.

6. The method of claim 1, wherein the target engine speed is determined to be equal to the instantaneous engine speed when the steering input indicates that a steering maneuver is being performed, or
wherein the target engine speed is determined to be different from the instantaneous engine speed when the steering input indicates that a steering maneuver is not being performed.

7. The method of claim 1, wherein the total power command is determined to be greater than a maximum power output threshold of the engine at the instantaneous engine speed when the power command information indicates that a component of the engine is overheating, and
wherein the target engine speed of the engine is determined to be greater than the instantaneous engine speed based on the total power command being greater than the maximum power output threshold of the engine at the instantaneous engine speed.

8. The method of claim 1, wherein the steering maneuver is traveling in any direction other than being within a threshold angular range of moving straight forward or backward.

9. A device, comprising:
one or more memories; and
one or more processors configured to:
receive power command information associated with a set of loads of an engine;
determine, based on the power command information, a total power command for the set of loads;
determine, based on the total power command and an instantaneous engine speed of the engine, a target engine speed for the engine, wherein the target engine speed is determined to be greater than the instantaneous engine speed when a temperature associated with the engine satisfies a threshold temperature; and
cause an engine control module to control the engine to operate in association with the target engine speed.

10. The device of claim 9, wherein the total power command corresponds to a sum of individual power requests, in the power command information, of the set of loads.

11. The device of claim 9, wherein the set of loads includes at least one of:
a transmission coupled to the engine, wherein the power command information includes a torque command of the transmission,
an electrical implement of the engine, wherein the power command information includes a current command and a voltage command of the electrical implement, or
a hydraulic implement of the engine, wherein the power command information includes a pressure command associated with the hydraulic implement.

12. The device of claim 9, wherein the target engine speed is determined to be greater than the instantaneous engine speed independent of the total power command.

13. The device of claim 9, wherein, when the one or more processors receives an operator input that indicates that a steering maneuver associated with a machine of the engine is being performed, the one or more processors are to maintain the target engine speed while the operator input indicates that the steering maneuver is being performed.

14. The device of claim 9, wherein the target engine speed is determined based on:
increasing a desired engine speed of the engine when the total power command is greater than a threshold corresponding to the instantaneous engine speed of the engine, or
decreasing the desired engine speed of the engine when the total power command is less than a threshold corresponding to the instantaneous engine speed of the engine,
wherein the desired engine speed is determined based on an operator input associated with a power output from the engine.

15. A system comprising:
an engine;
an engine control module;
a load monitoring device; and
electronic control unit to:
receive, from the load monitoring device, power command information associated with a load of an engine;
determine, based on the power command information, a total power command of the engine;
determine, based on the total power command, a target engine speed for the engine; and
maintain or allow an increase in the target engine speed while an operator input indicates that a steering maneuver is being performed.

16. The system of claim 15, wherein the power command information corresponds to a request for an increase or decrease in power associated with the load.

17. The system of claim 15, wherein the load monitoring device comprises at least one of:

a transmission controller of a transmission coupled to the engine, wherein the power command information includes a torque command of the transmission, an electrical implement controller associated with an electrical implement of the engine, wherein the power command information includes a current command and a voltage command of the electrical implement, or a hydraulic implement controller associated with a hydraulic implement of the engine, wherein the power command information includes a pressure command associated with the hydraulic implement.

18. The system of claim 15, wherein the target engine speed is determined based on an instantaneous engine speed of the engine and a desired engine speed of the engine, wherein the desired engine speed is determined based on an operator input associated with a power output from the engine.

19. The system of claim 15, wherein, the electronic control unit is configured to maintain the target engine speed while the operator input indicates that the steering maneuver is being performed.

20. The system of claim 15, wherein the target engine speed is determined to be different from an instantaneous engine speed based on the total power command satisfying a threshold power output associated with the instantaneous engine speed.

* * * * *